Sept. 20, 1966 R. E. MILLER 3,273,951

PORTABLE INSTRUMENT UNIT

Filed April 15, 1965

INVENTOR.
ROBERT E. MILLER

BY Henry Perin

ATTORNEY

United States Patent Office 3,273,951
Patented Sept. 20, 1966

3,273,951
PORTABLE INSTRUMENT UNIT
Robert E. Miller, Milford, Conn., assignor to Sperry Rand Corporation, New York, N.Y., a corporation of Delaware
Filed Apr. 15, 1965, Ser. No. 448,462
5 Claims. (Cl. 312—319)

This invention relates to a portable instrument unit and particularly to a case for carrying portable testing instruments of a delicate or sensitive nature, such as an oscilloscope or the like, and supporting and positioning the same therewithin during both transportation and use or operation thereof. The invention is especially adapted for a self contained viewable or indicating instrument unit, with its instrument viewable or indicating face adjacent a side wall of and fixedly held within an attache type case in either a nested or raised position. In the nested position, the viewable face of the instrument is protected by the lower case walls by being partially or wholly below the upper limit thereof. In the raised position, the said instrument viewable face is brought wholly above the lower case wall and in full view.

By having the case also fitted with panels therein for tools, parts, accessories, notebooks and the like for instant reference and use, the invention provides a unique portable test or maintenance kit unit which is trim, efficient, protective and self contained and permits and facilitates maintenance, servicing and testing at divers sites.

An object of the invention is to provide a portable viewable or indicating instrument locked against transverse movement within a protective carrying case.

Another object is to provide for the mounting of a viewable or indicating instrument in an attache type case for portability with arrangements to raise the instrument into a position for use while still within the case.

A further object is to provide tilting means within the said carrying case for positioning the face of the viewable or indicating instrument in a raised, viewable posture.

A further object is to provide a self contained portable carrying case instrument unit comprised of a hinged viewable or indicating instrument, tools and accessories for mobile use thereof.

Other objects and details of the invention will be apparent from the following description when read in connection with accompanying drawings, wherein.

Figure 1:
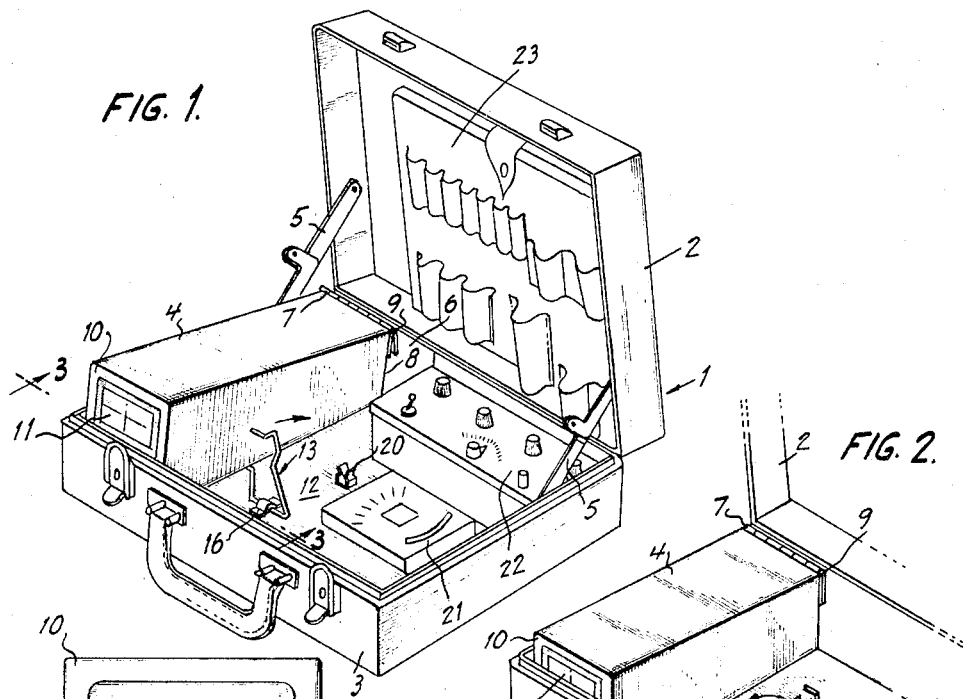
FIG. 1 is a perspective view of the invention with the viewable instrument in raised position.
Figure 2:
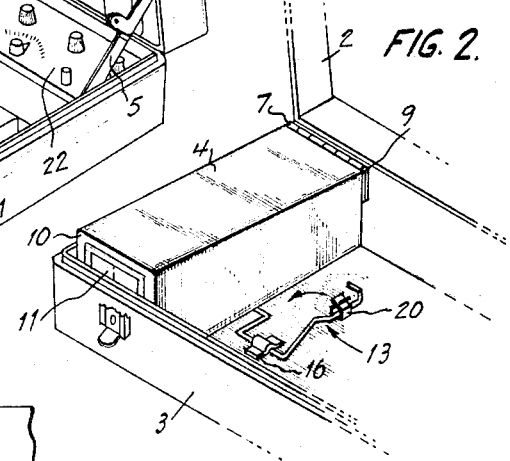
FIG. 2 is a partial perspective view showing the viewable instrument in nested position.
Figure 3:
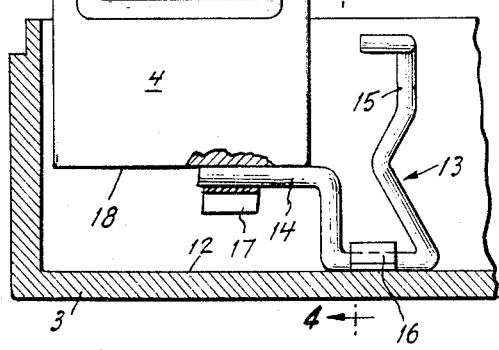
FIG. 3 is a view along line 3—3 of FIG. 1, with the manually operable tilting means partly in section.
Figure 5:
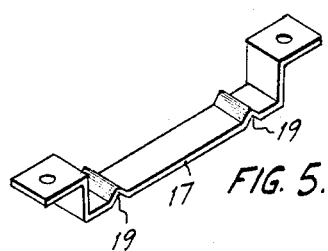
FIG. 5 is a perspective view of the instrument bracket forming part of the invention.

The invention consists of a case 1, preferably in the form of an attache type case, having an upper half 2 and a lower half 3, the lower half of which is adapted for housing a viewable or indicating instrument 4, in a convenient portion thereof. The upper half of the case 2 may be raised and the case held open by conventional hinges 5 affixed to the interior sides of the case walls. The upper portion of the rear lower inner case wall 6 is provided with one half of a hinge 7, such as a piano hinge. The rear end or back 8 of the said instrument 4 is provided with the other half of said hinge 7 at the upper portion thereof. An inserted pin or bolt 9 joins the hinge portions attached to the case wall 6 and instrument 4, respectively. Thus the upper rear end of the instrument 4 is hinged to the upper portion of the lower case rear inner wall 6. The front end 10 of the instrument containing the viewable face 11 is liftable for visibility. Such lifting is brought about by rotating the instrument 4 about the hinge 7 connecting the upper rear end of the instrument to the lower case rear inner wall.

Figure 4:
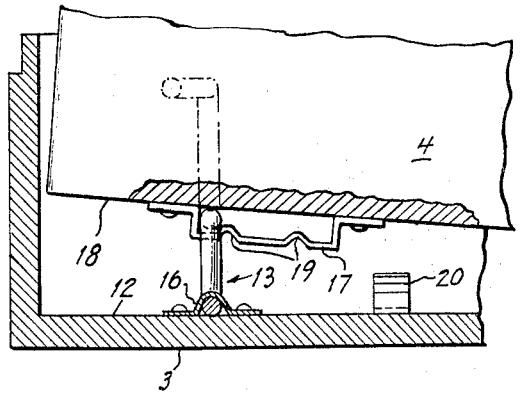
FIG. 4 is a sectional view along line 4—4 of FIG. 3.

The base of the lower half of the inner case 12 is fitted with a shaft means 13 for tilting the instrument face to raised posture, and, as will be described, also locking and securing the instrument against unintentional rotational movement within the case. The shaft is preferably round in cross section and of a suitable rigid material as shown in FIG. 4, and is fashioned so as to have a parallel offset extension 14 at one end extending beneath the instrument and an offset handle portion 15 at the other end. The shaft is rotatably clamped to the said inner base by an overlaying U-shaped strap 16 fastened to said base by staples or other fastening means. The parallel offset extension 14 of said shaft is adapted to be received within and to cooperate with a longitudinally extended U-shaped bracket 17 attached to the underneath portion 18 of the instrument, to permit the parallel offset extension 14 to slide therewithin. The respective ends of the instrument bracket also provide stop means for the offset extension of the shaft. The instrument bracket 17 may also be provided near its ends with protrusions to form notches 19 to receive and lock the said offset extension 14 in place in instrument raised or nested posture.

As shown, a rotational movement of the offset handle portion 15 of the shaft mechanism toward the front of the inner case will cause the parallel offset extension 14 of the shaft in the bracket opening underneath the instrument to slide therewithin, thus lifting the instrument to its raised posture, and locking it in raised posture when the parallel offset extension 14 is received beyond the front bracket protrusion 19. A rotational movement of the said handle offset portion toward the back of the case will conversely cause the parallel offset extension to be released from the bracket protrusion and to lower and lock the instrument in its nesting position when the parallel offset portion is received within the bracket protrusion at its rear end. The ends of the shaft may be bent to afford of the most convenient action to facilitate the raising and lowering of the instrument. The inner lower case may also be fitted with any convenient holding means for the handle offset portion to prevent the handle offset portion from being unintentionally moved, as for example, by a latch 20 or other holding device.

Thus in use at the site of testing, the case is opened and kept opened by the case hinges, the viewable instrument is tilted upwards and locked in such position, and the connections with the equipment to be tested, made. The convenient meter 21, control panel 22 and tool panel 23 within the portable case, complement the testing unit, all self contained in a convenient, portable and utilitarian kit. A notebook or manual may be fitted behind the tool panel 23 for ready reference. When the test at the site is finished, the viewable instrument is lowered into and locked in nesting position, the case closed and the user may then move on with the unit to the next site. Cushioning means for the instrument may also be provided within the case.

While there is above described but a limited embodiment of the invention, it is possible to provide still other embodiments and, it therefore, is desired that only such limitations be imposed upon the appended claims as are stated therein or required by the prior art.

I claim:

1. A portable instrument unit comprising an attache type case and a front face viewable instrument, a hinge connected between the back of said instrument and the inner rear wall of the base of said case, and manually operable means connected to the base of said case and to said instrument for positioning the front end of said instrument in raised or nested position within the base of said case.

2. The structure of claim 1, further including bracket means attached to the base of said case to lock the said manually operable means in fixed position.

3. The structure of claim 1, further including bracket means attached to the base of said instrument adapted to receive and cooperate with an offset slidable portion of the said manually operable means to position the said instrument in raised or nested position within the base of said case.

4. The structure of claim 3, wherein said bracket means is provided with protrusions cooperating with said offset slidable portion of said manually operable means to lock the said instrument in such raised or nested position.

5. The structure of claim 1, wherein the lower extremity of the viewable front face of said instrument is located above the base of said instrument at a point less than the height of the inner front wall of the base of said case, and the said manually operable means in one position has a dimension at least equal to the difference between the height of said inner front wall and the said point of location of such lower extremity of the viewable front face of said instrument.

References Cited by the Examiner

UNITED STATES PATENTS

| | | | |
|---|---|---|---|
| 2,259,651 | 10/1941 | McClure | 88—28 |
| 2,847,902 | 8/1958 | D'Incerti | 88—24 |
| 3,241,439 | 3/1966 | Kiner, et al. | 88—24 |

CLAUDE A. LE ROY, *Primary Examiner.*

F. DOMOTOR, *Assistant Examiner.*